April 7, 1970 O. KOLB 3,505,592

MULTI-PATH MAGNETIC CORE VOLTAGE REGULAR

Filed March 1, 1967 4 Sheets-Sheet 1

United States Patent Office 3,505,592

Patented Apr. 7, 1970

3,505,592

MULTI-PATH MAGNETIC CORE VOLTAGE REGULATOR

Otmar Kolb, Stuttgart-Weilimdorf, Germany, assignor to International Standard Electric Corporation Filed Mar. 1, 1967, Ser. No. 619,828

Claims priority, application Germany, Mar. 3, 1966, St 25,059

Int. Cl. G05f *1/04, 7/00*

U.S. Cl. 323—56 5 Claims

ABSTRACT OF THE DISCLOSURE

Multi-path magnetic core arrangements wherein a magnetic core component having substantially rectangular hysteresis loop is comprised of first and second magnetically equal circuits having a common portion. A first setting winding surrounds the common portion. This setting winding is used to increase the permanent flux toward saturation. An additional pair of setting windings surrounds each of the equal magnetic circuits respectively. These windings are used for changing the permanent magnetic flux towards zero. An aperture is located within the common portion. A drive winding is wound to pass through the aperture and end at one side of the common portion. An output winding passes through the aperture and terminates at the other side of the center portion. This arrangement prevents an inversion of magnetic flux direction. The multipath structure so arranged is ideal for use in regulator circuitry.

The invention relates to multipath-core arrangements for preventing flux inversion in magnetizable elements with substantially rectangular hysteresis loops in which the amount of the permanent flux can be set.

Such magnetic storage elements are generally known. These elements are described in detail, in the article by J. A. Rajchmann and A. W. Lo "The Transfluxor" in Proc. IRE vol. 44, pp. 321–332 (March 1956). To improve the explanation of the objects of the invention, FIG. 1 shows the known, principle arrangement using such a magnetizable element. The element of magnetic material, is formed in general as an annular core having substantially a rectangular hysteresis loop. The element in FIG. 1 has at one point of its periphery an aperture (conventionally also called "small aperture").

A setting winding E is wound over the entire leg, while at least one drive winding and one output winding T and A, respectively, passes through the small aperture which encompasses only a leg forming a part of the core's cross-section. With the aid of the setting winding E the permanent flux in the magnetizable element can be set according to one of the methods known, either step by step through setting pulses that are short compared to the time constant of the setting circuit. Alternatively an impulse that is long compared to the time constant of the setting circuit or direct current of corresponding amplitude can be used to set the permanent flux. The pulse generator PG1, in FIG. 1, serves to set the permanent flux in the direction of saturation and the pulse generator PG2 to reduce the amount of the permanent flux towards zero. A change of the amount of the permanent flux in the core has the same effect in the drive winding and the output winding A as a change of the coupling between both windings. If alternating current is applied to the drive winding T the AC voltage, at the output winding A depends on the value of the permanent flux in the legs adjacent to the small aperture. FIG. 2 shows this dependence. In this figure the amount of the output voltage $U_{outp.}$, at the output winding A, is shown to be a function of the permanent flux. From this figure it is obvious that the value of $U_{outp.}$, is dependent of whether the permanent flux has a north-south or a south-north direction, only the amount of the permanent flux determines the output voltage $U_{outp.}$ if a constant alternating current is applied to the drive winding T.

If such a magnetizable element is inserted as a storage element into a control arrangement, corresponding to the application St 24,673 (case O. Kolb 7), the operating range of such an element is between the value zero of the permanent flux and the saturation point in the north-south direction, for example. There is an ambiguity of the output signals with respect to the number of the setting pulses if when reducing the value of the stored permanent flux by setting in the direction zero, the value zero of the permanent flux is exceeded in the other flux direction. That is in the south-north direction, because an increase and a decrease of the output signal is given by change of the permanent flux from A1 to B1 and A2 to B2 respectively, shown in FIG. 2, consequently a control with inverse trend.

It is the object of the invention to provide an arrangement to prevent the inversion of the flux direction in a magnetizable element with a substantially rectangular hysteresis loop when the amount of permanent flux is set either step by step through short setting pulses, or by the amplitude of a direct current or of a single long pulse, applied to the setting winding for the purpose of varying the value of the permanent flux between zero and saturation. The pulse lengths are relative to the time constants of the setting circuits. In the arrangement an increase or a decrease in the permanent flux is achieved by the opposite polarity of the setting pulses or by the opposite winding sense of the associated setting windings. The problem is solved, according to the invention, in that the magnetizable element is subdivided into two magnetically equal circuits with a common center part containing the aperture for the drive winding and for the output winding. For the changes of the permanent flux in the direction of saturation and zero respectively, separate setting windings are provided. The setting winding to change the permanent flux in the direction of saturation encompasses the common center part. On the other hand, the setting winding to change the permanent flux in the direction of zero is subdivided into two electrically equal partial windings which encompass always one of the two circuits that are magnetically equal. Further, the sense of turns of the two partial windings is selected so that a circulating flux is achieved in the element without the common center part.

The invention is now in detail described with the aid of the accompanying figures, wherein.

Figure 3:
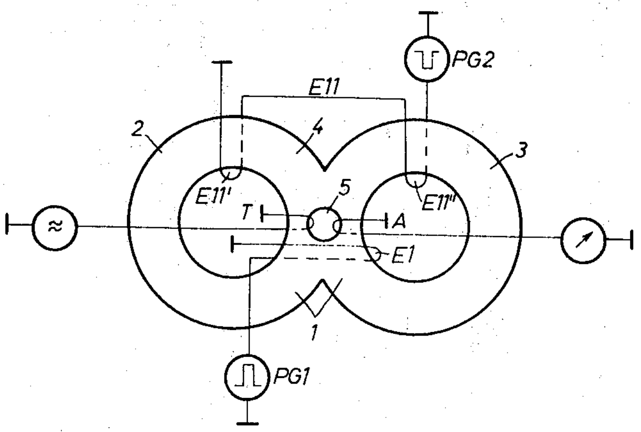
Figure 4A:
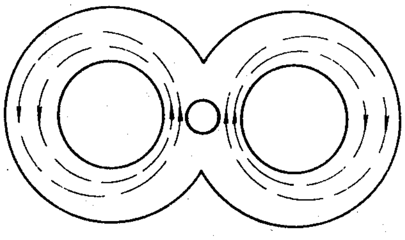
Figure 4B:
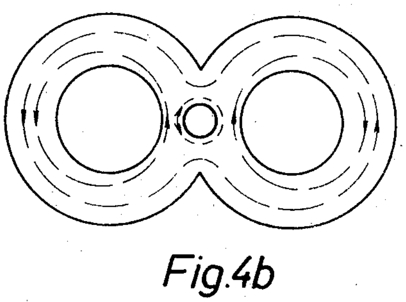
Figure 4C:
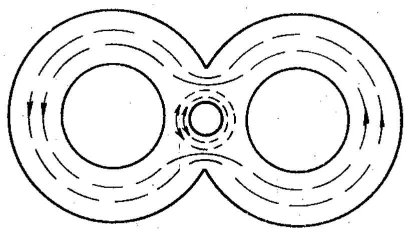
Figure 5A:
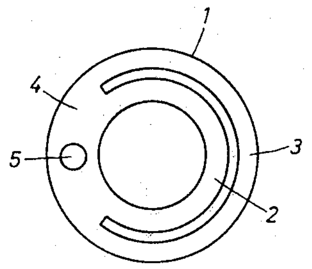
Figure 5C:
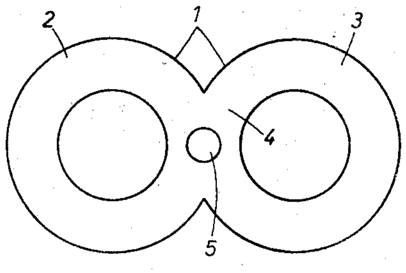
Figure 5B:
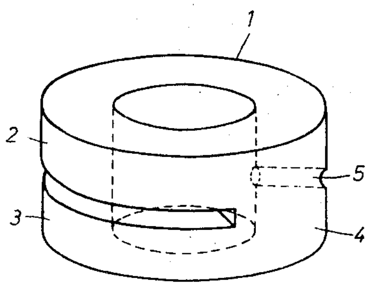
Figure 5D:
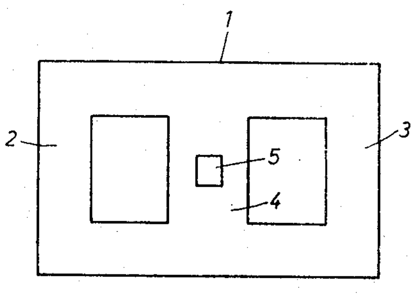
Figure 5E:
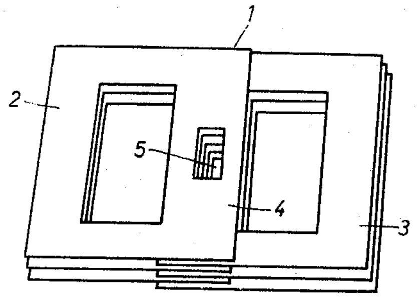
Figure 5F:
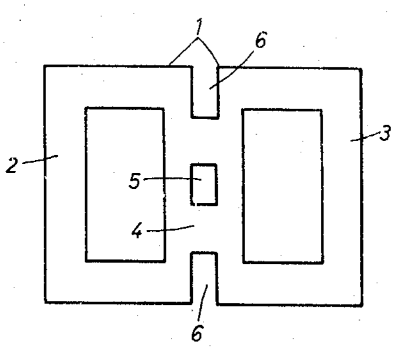
Figure 6:
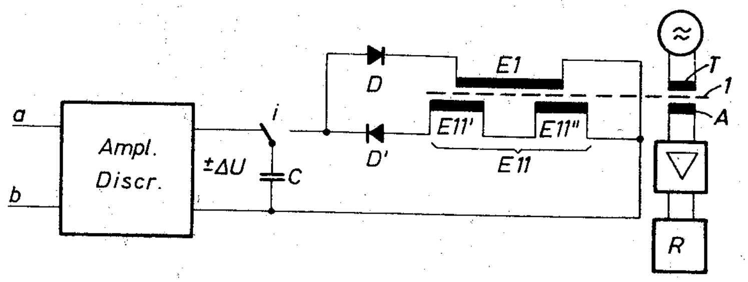
Figure 7:
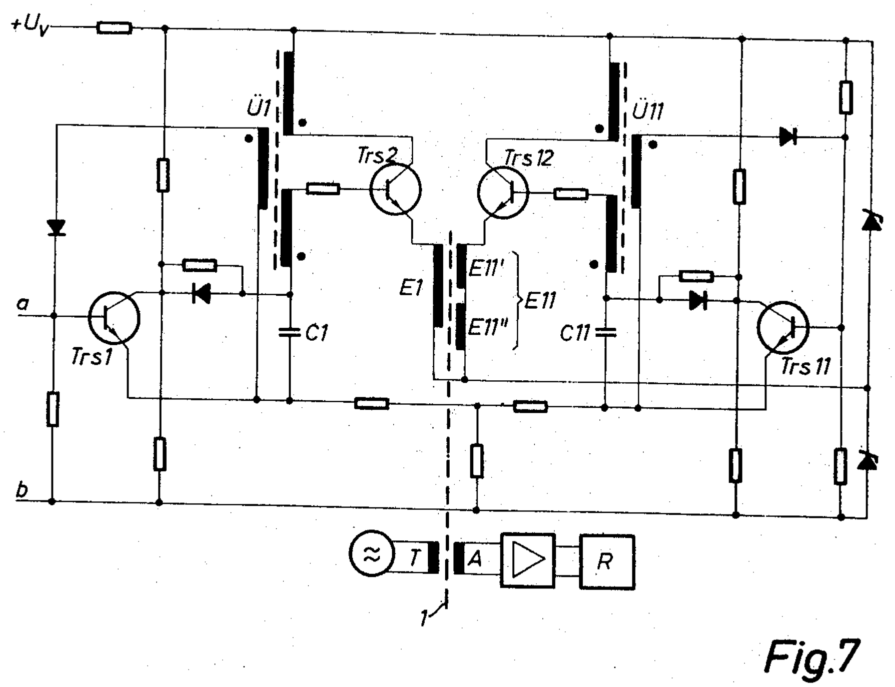

FIG. 3 shows a storage arrangement according to the invention with a magnetizable element with a substantially rectangular hysteresis loop, FIG. 4 shows the course of the field lines of the permanent and of the alternating flux, whereby FIG. 4*a* shows this course for the permanent saturation of the center part, FIG. 4*b* shows this course for a partial value of the permanent flux in the center part, and FIG. 4*c* shows this course with the permanent flux through the center part being equal to zero, FIGS. 5*a*–5*c* show various constructions for the core of a magnetizable element according to the invention, FIG. 6 shows the application of a storage arrangement for a control path, having a magnetizable element according to the invention, and FIG. 7 shows the application of this storage element in a pilot-controlled level regulator.

Figure 1:
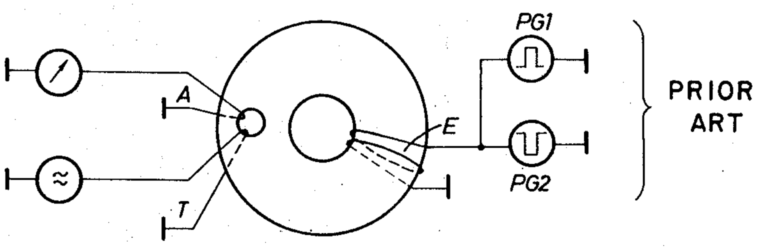
FIG. 1 shows the known principle arrangement of a storage with a magnetizable element with a substantially rectangular hysteresis loop.
Figure 2:
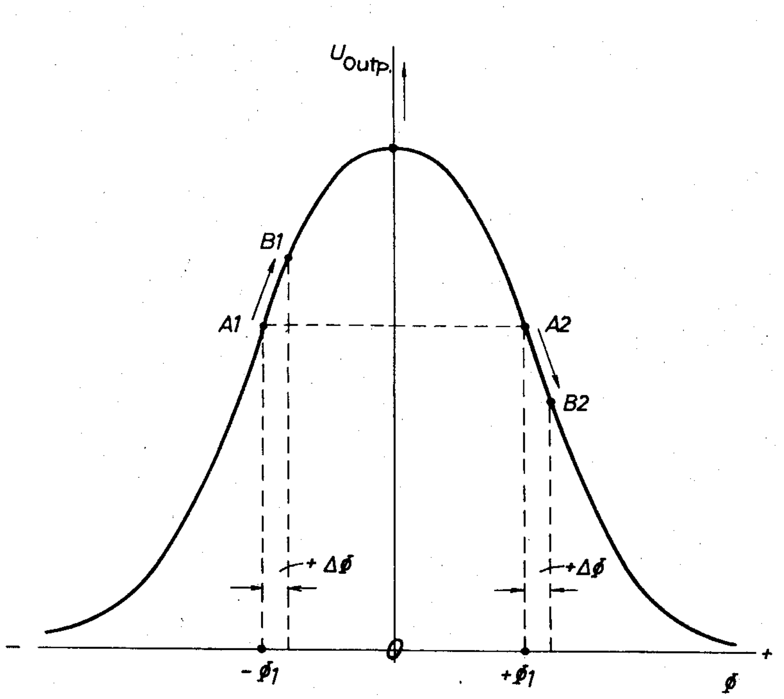
FIG. 2 shows the response characteristic of the arrangement of FIG. 1 of the output AC-voltage at the output winding, with respect to the permanent magnetic flux.

The invention is now described in detail with the aid of the figures. FIG. 3 shows the arrangement of a storage device according to the invention, corresponding to FIG. 1, with a magnetizable element having approximately rectangular hysteresis loop. The magnetizable element 1 is subdivided into two magnetically equal circuits 2 and 3 with a common center part 4 which comprises also the aperture 5 for the drive winding T and the output winding A. The setting winding E1 for increasing the permanent flux, that means its change towards saturation, encompasses the common center part 4. For the decrease of the permanent flux, that means its change in the direction zero a second setting winding 11 is provided, subdivided into two winding halves E11′ and E11″. These partial windings E11′ and E11″ encompass always one of the magnetically equal circuits 2 and 3, respectively. The winding sense of both series-connected halves E11′ and E11″ is selected thus that in the core 1 a permanent flux is rised circulating in the magnetically equal circles 2 and 3, without the center part 4 (FIG. 4*c*), whereas the setting winding E1, encompassing the center part 4, produces a permanent flux in said center part 4 which is then subdivided onto both circuits 2 and 3 (FIG. 4*a*). With the aid of the setting winding E1 the permanent flux in the center part 4 can be changed up to saturation. If the permanent flux in the center part is zero a circulating permanent flux can be produced by the setting winding E11 only in the circuits 2 and 3. If, in contrast the center part 4 has been permanetly pre-excited by the setting winding E1 that means, if between the ends of the center part 4 a stored permanent magnetomotive force exists the permanent flux in the center part 4 is reduced by energizing the setting winding E11 (FIG. 4*b*). At a sufficiently high single or continuous feeding of the setting winding E11 through pulses the center part 4 is completely demagnetized (FIG. 4*c*) whereby a flux inversion in the center part 4 is impossible.

By the design of the magnetizable element 1 and the setting windings E1 and E11 the problem to prevent an inversion of the flux direction of the permanent flux is solved in the part of the magnetizable element 1, determining the coupling between drive winding T and output winding A, that means in this case the center part 4.

FIG. 5 shows examples for different types of construction of a magnetizable element according to the invention. FIG. 5*a* shows a cylindrical core in the body of which a hollow cylindrical segmental shaped air gap is provided perpendicular to the basic surface on a part of its circumference, so that this portion of the body is subdivided into two separate circles 2 and 3. 4 is the common body portion and 5 the small aperture for the drive winding T and the output winding A. FIG. 5*b* shows this core, but with an air gap arranged in parallel to the basic surface. In FIG. 5*c* the core 1 has the basic surface of an 8 i.e. the core is formed so to say by opening the core as shown in FIG. 5*b*. 2 and and 3 again represent the two magnetically equal circuits 4 is the common center part, 5 the aperture for the drive winding T and the output winding A. The shapes of cores, shown in FIG. 5*a–c*, are suitably of ferrite materials, while the cores shown in the FIGS. 5*d–f* may also be made as laminated cores. The shape of the core in FIG. 5*d* corresponds to the M-shaped (closed E- and I-shaped) laminations known for transformer cores without the aperture 5. FIG. 5*e* shows such a core with the same shape made by staggering of two single laminations. The spaces between the metal sheets in the circuits 2 and 3 can be filled by closed U-and I-shaped intermediate layers of paper, insulating material or with the laminations material itself. FIG. 5*f* shows a core with the same shape, the center part 4 of which shows recesses 6, serving to influence the course of the magnetic field lines.

In considering ferrite cores for practical use as storage element in level controlled transmission routes it was revealed that, in case of a step by step setting of the permanent flux, the first step of the flux change after an inversion of the direction of permanent flux variations is larger at least by the factor 3 than the following steps in the same direction. The cause is probably the not sufficiently exact rectangular hysteresis loop that results in a too soft transition between inversible and irreversible part of this loop. For laminated cores this appearance could be kept negligibly small, if a nickel-iron alloy was used as core material with approximately 50% nickel contents, a saturation flux density of approximately 15,000 gauss and a coercive force of approximately 0.15 oerstedt.

By the core shapes and winding arrangements described it is also achieved that, at a preceding change of the value of the permanent flux due to external fields, the original condition is restored automatically by the control circuit.

Now two examples will be used to describe the operation of the magnetizable elements according to the invention as storage elements in control systems. FIG. 6 shows an arrangement in which the input terminals *a* and *b* of an amplitude discriminator receive the signal to be regulated as a DC-voltage analogue value. The output of this amplitude discriminator furnishes, by comparing the analogue value of this signal with a pre-defined reference signal a differential voltage $\pm\partial U$, the amplitude of which is in proportion to the amount of deviation of the signal to be regulated and the polarity of which is in proportion to the direction of said deviation. A capacitor C is charged to the differential voltage $\pm\partial U$ via the non-operative side of a switch-over contact *i*. Said switch-over contact *i* is controlled by a pulse generator, not shown on the drawing. The contact *i* may be a mechanical contact or an electronic switching facility with same function. Its operative side periodically connects the capacitor through oppositely poled rectifiers D and D′, depending on the polarity of the differential voltage $\pm\partial U$, and, consequently, on the capacitor charge, either to the setting winding E1 (increase of flux towards saturation) or to the setting winding E11 (reduction of flux towards zero). A drive generator is connected to the drive winding T, while the control signal is derived from the output winding A, signal influences the control element R after amplification, if so required. For the contact-making periods of the change-over contact *i* the following conditions exist. The non-operative side must be closed until the capacitor C is completely charged to the potential $\pm\partial U$. For the operative side two possibilities are given, being different in principle. Either the contacting time must be short compared to the time constant of the setting circuit of the magnetizable element, then a step by step setting is obtained whereby the repetition frequency must correspond to the control speed desired, or the contacting time must be so long that practically the whole capacitor charge flows through the setting winding (time constant of the setting circuit small compared to the contacting time), whereby the repetition frequency must be small compared to the setting period of the entire control system; the stepping level is then determined by the energy stored in the capacitor. With the exception of the core and winding arrangement according to the invention to prevent the flux inversion such a control section must be considered as prior art due to the literature and patent specifications cited in the preamble, besides the other printed matters cited therein.

The arrangement in FIG. 7 shows the use of a magnetizable element according to the invention in a pilot-controlled level regulator of intelligence transmission technique. In this arrangement the magnetizable element is set in a step by step manner. In order to use transistors T*rs*2 and T*rs*12 of the same conductivity type for the setting generators and in order to apply the principles of the present invention, the setting winding E of the magnetizable element 1 is subdivided into two physically separated, but oppositely wound windings E1 and E11, so that step by step changes of the permanent flux in the center part 4 occur in the opposite direction due to pulses of same polarity of both transistors T*rs*2 and T*rs*12, respectively. In this circuit arrangement the transistors T*rs*1 and T*rs* 11 have a duplex-function. Due to the turn-off voltage at the end of an impulse the transformer Ü1 or Ü11 is through-connected with the aid of the third winding via the diodes of the transistors T*rs*1 or T*rs*11, respectively, and the capacitor C1 or C11 is short-circuited. The diodes between capacitor and collector passes by the parallel-connected resistors and provide a low-ohmic discharge path, thus representing a sufficiently small discharge time.

The circuit arrangement with the transistors T*rs*1 and T*rs*11 has further the effect of a phase inversion stage. This circuit arrangement was first described by O. H. Schmitt in the article "Cathode Phase Inversion," published in "Journal of Scientific Instruments," 1938. The reference level, determined by the voltage divider, is led to the base of transistor T*rs*11, while the control signal, e.g. a DC-signal analogous to the pilot level is applied to the base of transistor T*rs*1 via the terminals *a* and *b*. Depending on whether the control level is larger or smaller than the reference level the setting generator is started through the transistor T*rs*11 or T*rs*1. A drive generator is connected to the drive winding T, while the control level is derived from the output winding A through which, if so required, the control element R is operated, after amplification.

What is claimed is:

1. A regulator circuit using magnetic core components having substantially rectangular hysteresis loops, said core components being multi-path structures comprising first and second magnetically equal circuits, said magnetically equal circuits having a common portion, first aperture means in said common portion, first setting winding encircling said common portion for increasing the permanent flux to saturation, second setting winding means encircling each of said first and second magnetically equal circuits for decreasing the permanent flux toward zero, a drive winding passing through said first aperture and extending toward one side of said common portion, an output winding passing through said first aperture and extending toward the other side of said common portion, and means for applying a voltage to said setting windings to adjust the permanent flux as a function of the voltage so applied to thereby vary the output voltage on the output winding when a drive voltage is applied to said drive winding as a function of said voltage applied to said setting windings.

2. The magnetic core component of the regulator circuit of claim 1 wherein said core component comprises laminated sheets.

3. The magnetic core components of claim 2 wherein each of said laminated sheets comprises a sheet steel border surrounding a second aperture, said first aperture being located on one side of said sheet steel border, and wherein said core component is fabricated by staggering said individual laminations while maintaining said first apertures coaxial.

4. The regulator circuit of claim 1 wherein the voltage applied to the setting winding is derived from an amplitude discriminator providing a differential voltage, and wherein said differential voltage is periodically applied to a capacitor, means for then periodically discharging the capacitor through either said setting winding wound around said common portion or said setting winding wound around said first and second magetically equal circuits depending on the polarity of the voltage charge on said capacitor.

5. The regulator circuits of claim 4 wherein the sense of the setting windings wound around said first and second magnetically equal circuits is such as to eliminate the magnetic flux from said common portion.

References Cited

UNITED STATES PATENTS

| | | | |
|---|---|---|---|
| 3,026,421 | 3/1962 | Crane et al. | 340—174 |
| 3,217,178 | 11/1965 | Burns | 340—174 |

OTHER REFERENCES

IBM Technical Bulletin, Butler, vol. 1, No. 4, December 1958, pp. 34 and 35.

BERNARD KONICK, Primary Examiner

KENNETH E. KROSIN, Assistant Examiner

U.S. Cl. X.R.

307—88, 323—89